United States Patent
Bradfield

Patent Number: 5,453,648
Date of Patent: Sep. 26, 1995

[54] BRIDGE RECTIFIER HAVING AN OUTPUT TERMINAL STUD

[75] Inventor: Michael D. Bradfield, Anderson, Ind.

[73] Assignee: General Motors Corporation, Detroit, Mich.

[21] Appl. No.: 136,067

[22] Filed: Oct. 14, 1993

[51] Int. Cl.$^6$ ............................. H02K 11/00; H02M 1/00
[52] U.S. Cl. .......................... 310/71; 310/68 D; 363/145
[58] Field of Search .................................. 363/141, 144, 363/145; 310/68 R, 68 D, 71

[56] References Cited

U.S. PATENT DOCUMENTS

| | | | |
|---|---|---|---|
| 4,606,000 | 8/1986 | Steele et al. | 363/145 |
| 4,673,323 | 6/1987 | Russo | 411/387 |
| 4,843,267 | 6/1989 | Kaneyuki | 310/68 |
| 5,233,246 | 8/1993 | Yockey | 310/71 |
| 5,266,857 | 11/1993 | Gotoh | 310/71 |

Primary Examiner—Steven L. Stephan
Assistant Examiner—Matthew V. Nguyen
Attorney, Agent, or Firm—Howard N. Conkey

[57] ABSTRACT

A bridge rectifier for rectifying the alternating output voltage of an alternating current generator. The bridge rectifier has two heat sinks which are electrically insulated from each other. Each heat sink carries groups of semiconductor diodes that are respectively electrically connected to the heat sinks. A metallic output terminal stud is connected to and supported by one of the heat sinks. A part of the terminal stud has self-tapping threads and this part is tapped into a hole in the heat sink to thereby provide a self-tapped threaded connection between the terminal stud and the heat sink. The terminal stud has an electrical connector portion that has conventional threads. A threaded nut is adapted to be screwed onto the threaded connector portion to thereby secure a terminal connected to a conductor or cable in place.

12 Claims, 2 Drawing Sheets

5,453,648

BRIDGE RECTIFIER HAVING AN OUTPUT TERMINAL STUD

BACKGROUND OF THE INVENTION

This invention relates to a bridge rectifier for rectifying the output voltage of an alternating current generator and more particularly to a bridge rectifier that has an output terminal stud that is connected to one of the heat sinks of the bridge rectifier by a self-tapping thread.

Bridge rectifiers for rectifying the output voltage of an alternating current generator are well known to those skilled in the art, one example being the bridge rectifier shown in the United States patent to Steele et al., 4,606,000. FIG. 7 of that patent illustrates an output terminal stud 144 that is electrically connected to the positive heat sink of the bridge rectifier. The stud extends through an end frame of the generator and through holes in the heat sinks of the bridge rectifier. The electrical connection between the heat sink and stud relies on clamping pressure provided by tightening a nut 156 that is threaded onto a threaded portion 144A of the stud. Further, this terminal stud connection requires an insulator 146 to electrically insulate the terminal stud from the alternator end frame and from the negative heat sink. With time, temperature and vibration the stacking of parts can loosen causing the integrity of the electrical connection to deteriorate. This leads to increased resistance, and then excessive heat due to high current levels, and eventually failure of the generator. Further, several parts are required to provide the output connection and therefore the piece or part cost and assembly cost is high.

SUMMARY OF THE INVENTION

It accordingly is an object of this invention to provide a stud terminal connection for a bridge rectifier that improves the electrical connection between the stud and the heat sink and which also reduces the number of pieces or parts that are required to make the terminal connection. This is accomplished by securing a metallic terminal stud directly to the positive heat sink of the bridge rectifier so that the positive heat sink forms the sole support for the stud. The stud has a portion that has self-tapping threads and this portion of the stud is threaded into a cylindrical hole formed in the positive heat sink. The self-tapping threads on the studs cut threads into the cylindrical internal wall of the hole so that the stud, when fully assembled, is secured to the positive heat sink through a self-tapped threaded connection. This self-tapped threaded connection between the stud and heat sink provides an arrangement where good electrical contact is made through the self-tapped threads, instead of through clamping pressure. By using the self-tapped threads, the electrical resistance between the stud and heat sink can be as low as about 10% of the electrical resistance between the stud and heat sink where the terminal connection is made as shown in FIG. 7 of the above-referenced Steele et al. patent. Further, the terminal connection of this invention uses only one part, namely the terminal stud. In the arrangement shown in FIG. 7 of the Steele, et al. patent, three parts are required, namely the stud 144, the nut 156 and the insulator 146.

DESCRIPTION OF THE PREFERRED EMBODIMENT

Figure 1:
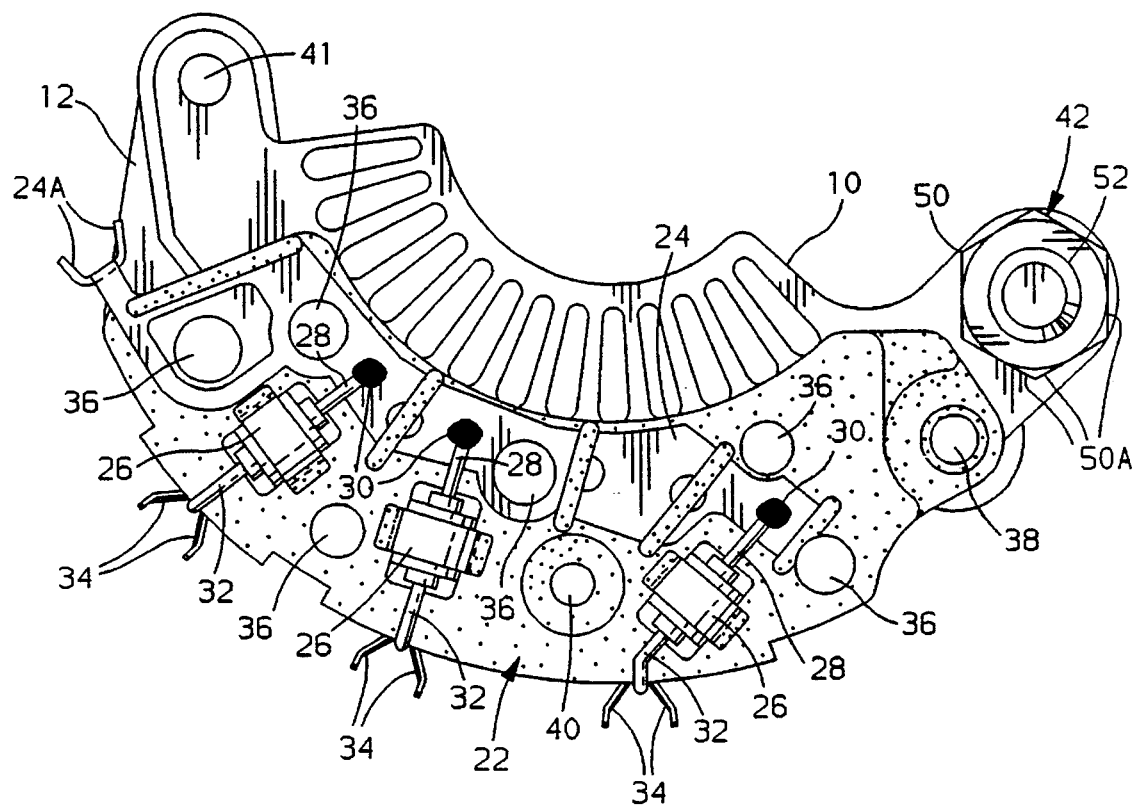
FIG. 1 is a plan view of a bridge rectifier that has a terminal stud made in accordance with this invention.

The bridge rectifier to be described is of the same type as that disclosed in the above-referenced United States patent to Steele et al., 4,606,000 and the disclosure of the patent is incorporated herein by reference.

Referring now to the drawings, a three phase full-wave bridge rectifier is illustrated that is comprised of a heat sink 10 that is formed of aluminum and a heat sink 12 that is formed of copper. The heat sinks 10 and 12 are electrically insulated from each other by a thin insulator 14.

Figure 4:
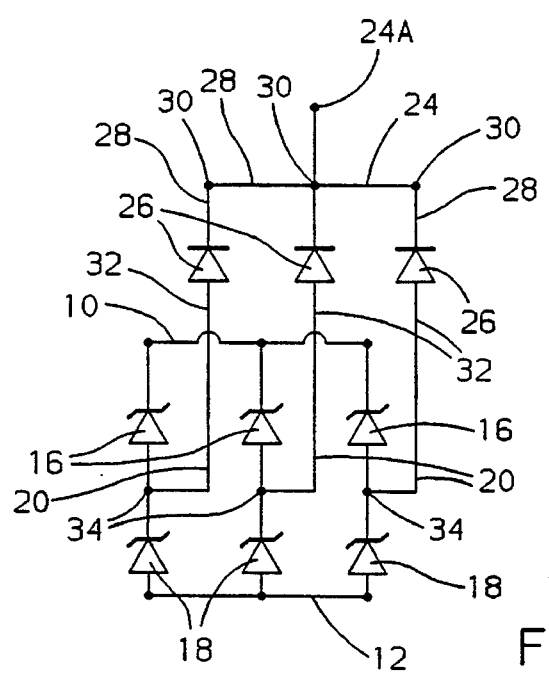
FIG. 4 is a schematic circuit diagram of the bridge rectifier and a diode trio.

Heat sink 10 carries three semiconductor diodes of the avalanche silicon type. These diodes have each been designated as 16 in FIG. 4. The cathode of each diode 16 is connected to heat sink 10 and accordingly heat sink 10 is a so-called positive heat sink since a positive direct voltage is developed on heat sink 10.

Heat sink 12 also carries three semiconductor diodes of the avalanche silicon type. These diodes are each designated as 18 in FIG. 4. The anodes of diodes 18 are connected to heat sink 12 and accordingly heat sink 12 is a so-called negative heat sink since a negative direct voltage is developed on heat sink 12.

The anodes of diode 16 are respectively connected to the cathodes of diodes 18 by conductors 20.

The elements that have been described can be like those shown in the above-referenced Steele et al. patent. In this regard, the diodes 16 and 18 can take the form of diode chips.

The bridge rectifier has a cover 22 that is formed of plastic electrical insulating material. This cover carries an insert molded metallic terminal strip 24 that has crimping wings 24A that can be crimped onto a conductor. Cover 22 carries three diodes 26 that form a so-called diode trio. The cathodes of diodes 26 are connected to conductor strip 24 by respective conductors 28 that are soldered to strip 24 at points 30. The anodes of diodes 26 are connected to conductors 32 which become connected to crimping wings 34 when the conductors 32 and the ends of phase leads (not illustrated) connected to the phase windings of an alternating current generator are all crimped together. Crimping wings 34 are shown as terminals 34 in FIG. 4 and they are connected respectively to conductors 20.

The cover 22 has six openings 36 that are aligned with the diodes carried by the heat sinks. These openings provide access openings for applying a protective coating such as silicone rubber to the diodes.

Figure 3:
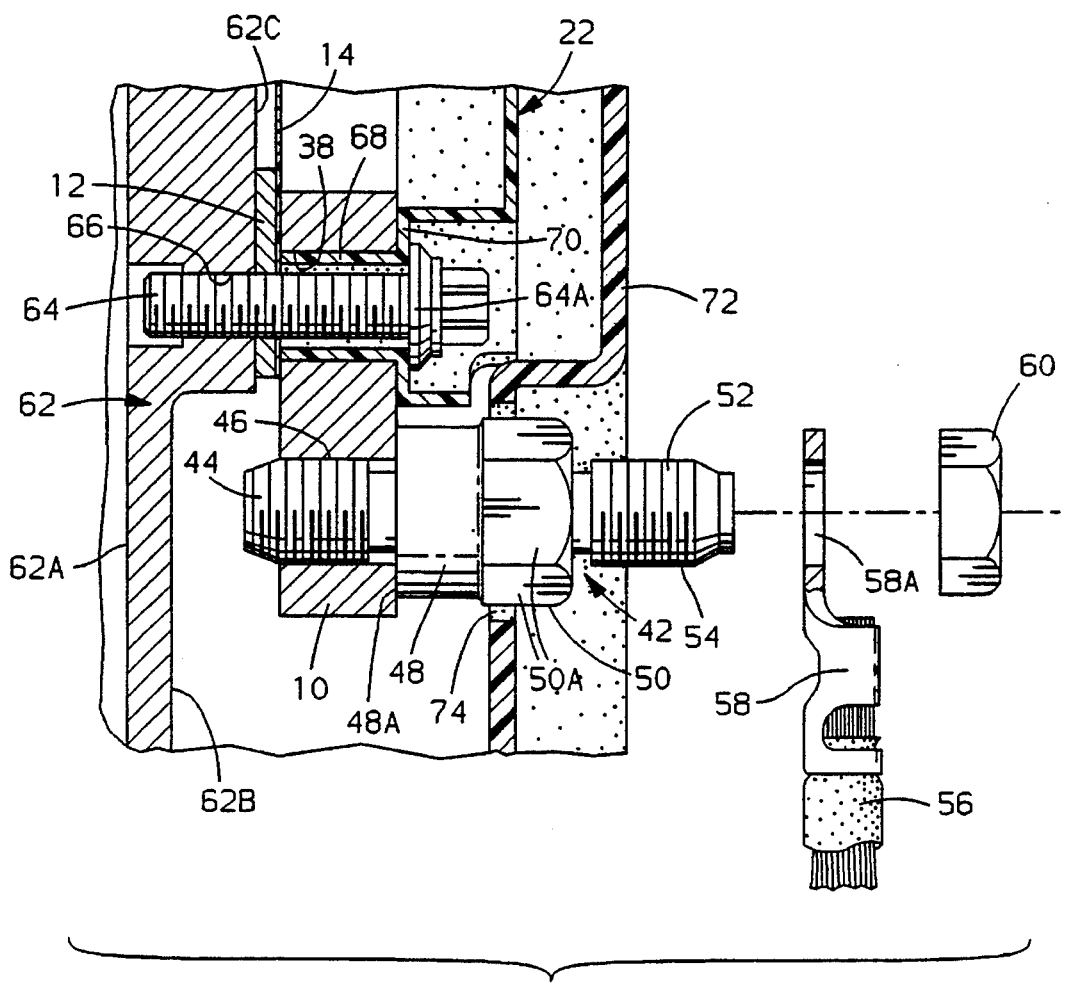
FIG. 3 illustrates the bridge rectifier supported from the end frame of an alternating current generator.

The bridge rectifier has three openings or holes 38, 40 and 41 that receive mounting screws for securing the bridge rectifier to the end frame of an alternating current generator, as will be described in more detail hereinafter when FIG. 3 is described. Hole 38 is made up of aligned holes formed in cover 22, heat sink 10, insulator 14 and heat sink 12. The same is true of hole 40. Hole 41 is made up of aligned holes formed in heat sink 10, insulator 14 and heat sink 12.

The heat sink 10 carries a steel output terminal that is generally designated as 42. This stud has an axially extending portion 44 that has self-tapping threads 46, a circular portion 48, a nut portion 50 and a portion 52 that has threads 54. The nut portion 50 has a hexagonal configuration comprised of six flat surfaces 50A.

Figure 2:
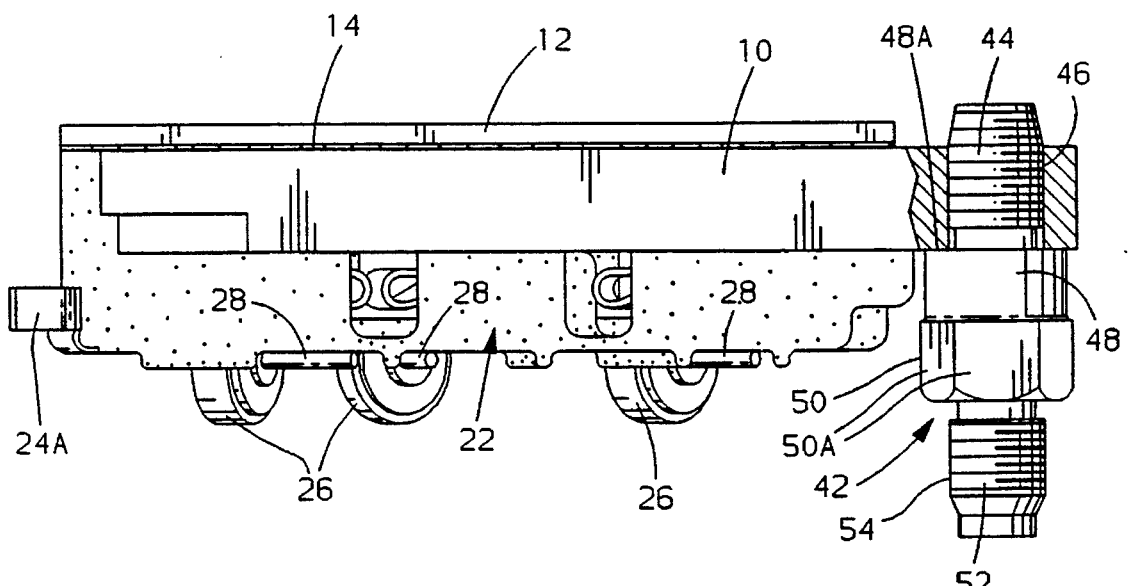
FIG. 2 is an end view partly in section of the bridge rectifier shown in FIG. 1.

The manner in which the terminal stud 42 is assembled to heat sink 10 will now be described. A cylindrical smooth hole that has no threads is formed in heat sink 10 by drilling or by extrusion. The portion 44 of stud 42 is now driven and screwed into the hole and when this occurs, the self-tapping threads 46 cut threads into the wall of the hole. The self-tapping threads 46 have a larger diameter than the hole. The stud can be rotated by a tool that engages nut portion 50. The stud is tightened to a desired torque value and in its final assembled position, the annular surface 48A of cylindrical portion 48 engages a surface of heat sink 10 as shown in FIGS. 2 and 3.

From what has been described, it can be appreciated that a self-tapped threaded connection has been made between stud portion 44 and heat sink 10. This self-tapped connection provides a good low resistance electrical connection between the stud and the heat sink since all of the self-tapping threads 46 are in direct metal-to-metal contact with the threads that have been formed in the hole in heat sink 10. Further, the self-tapped threaded connection forms a mechanical connection between stud 42 and heat sink 10. A locking compound may be applied to the self-tapping thread 46 prior to being tapped into the hole in the heat sink 10 to increase the torque required to unscrew the stud from the heat sink.

The threads 54 on portion 52 of stud 42 are conventional threads, that is, they are not self-tapping threads. The portion 52 with threads 54 forms a means for making an electrical connection to a cable or conductor that may be a battery cable. Thus, as shown in FIG. 3 a cable or conductor 56 is connected to an eyelet terminal 58 that has a cylindrical hole 58A. When the terminal 58 is assembled, portion 52 of the stud projects through hole 58A. A threaded nut 60 is now threaded onto the threads 54 to force the portion of the terminal located about hole 58A against an end of nut portion 50. Nut 60 is tightened to make a secure connection between terminal 58 and cable 56 and portion 52 of the terminal stud 42.

Both the self-tapping thread 46 and the conventional thread 54 are right-handed. Thus, clockwise rotation of thread 46 tends to screw the portion 44 in and clockwise rotation of nut 60 tends to screw the nut 60 onto thread 54. This means that when nut 60 is screwed onto thread 54 the torque from tightening the nut 60 will tend to tighten the connection between self-tapping thread 46 and heat sink 10.

By way of example and not by way of limitation, the thread 54 may be a M8×1.5 Type W self-tapping thread. Thread 46 may be a M8×1.25 thread. The diameter of the self-tapping threads 46 may be about 8.0 mm.

Referring now to FIG. 3, the reference numeral 62 designates the metallic slip ring end frame of an alternating current generator. This generator may be of the type disclosed in the above-referenced Steele et al. patent. The end frame 62 has an inner wall or surface 62A that faces the interior of the generator, that is, it faces the rotor of the generator. The outside wall of end frame 62 is designated as 62B.

The bridge rectifier that has been described is secured to the outer wall 62B of the generator. To this end, a screw 64 is screwed into a threaded hole 66 formed in the end frame. The screw passes through the previously described hole 38. The rectifier cover 22 has a tubular portion 68 located in the hole in heat sink 10 and an annular wall 70. Screw 64 passes through tubular portion 68 and has a flange portion 64A which bears against annular wall 70. Tubular portion 68 and wall 70 serve to electrically insulate the screw 64 from heat sink 10. Two other screws (not illustrated) are used to secure the bridge rectifier to end frame 62. They pass through previously described holes 40 and 41.

The alternator shown in FIG. 3 has a protective cover or housing 72 that is formed of a molded plastic material. This cover is attached to end frame 62 by means such as fasteners which have not been illustrated. The cover 72 has a circular opening 74. Terminal stud 42 projects through opening 74 with nut portion 50 being located in opening 74. Connector portion 52 is accessible for connection to cable 56 by means of terminal 58 and nut 60.

It can be seen from FIG. 3 that a surface of negative heat sink 12 directly engages an outer wall surface 62C of end frame 62.

The embodiments of the invention in which an exclusive property or privilege is claimed are defined as follows:

1. A rectifier unit having an output terminal that is adapted to be connected to a conductor comprising, a metallic heat sink, a metallic terminal stud secured to said heat sink, said terminal stud having a first axially extending portion that has self-tapping threads and a second axially extending electrical connector portion that is adapted to be connected to a conductor, said metallic heat sink having an opening, said first portion of said terminal stud being located in said opening and having a self-tapped threaded connection to said heat sink which is produced by said self-tapping threads when said first portion of said stud is screwed into said opening, said self-tapped threaded connection providing an electrical connection between said terminal stud and said heat sink and providing a mechanical connection between said terminal stud and said heat sink for supporting said terminal stud from said heat sink.

2. The rectifier unit according to claim 1 where said heat sink is formed of aluminum.

3. The rectifier unit according to claim 1 where said heat sink extends laterally in a plane and where said terminal stud is located normal to said plane.

4. The rectifier unit according to claim 1 where said second axially extending electrical connector portion has threads that are adapted to be engaged by a threaded nut for securing a terminal that is connected to a conductor to said second axially extending electrical connector portion.

5. A polyphase bridge rectifier for rectifying the alternating output voltage of an alternating current generator comprising, first and second metallic heat sinks, an insulator disposed between said heat sinks for electrically insulating said heat sinks from each other, a first group of diodes carried by and electrically connected to said first heat sink, a second group of diodes carried by and electrically connected to said second heat sink, a metallic terminal stud secured to said first heat sink, said terminal stud having a first axially extending portion that has self-tapping threads and a second axially extending electrical connector portion that is adapted to be connected to a conductor, said first heat sink having an opening, said first portion of said terminal stud being located in said opening and having a self-tapped threaded connection to said first heat sink which is produced by said self-tapping threads when said first portion of said stud is screwed into said opening, said self-tapped threaded connection providing an electrical connection between said terminal stud and said first heat sink and providing a mechanical connection between said terminal stud and said first heat sink for supporting said terminal stud from said first heat sink.

6. The bridge rectifier according to claim 5 where said first heat sink is formed of aluminum.

7. The bridge rectifier according to claim 5 where said first and second heat sinks extend laterally in first and second parallel planes and where said terminal stud is located normal to said planes.

8. The bridge rectifier according to claim 5 where said second axially extending electrical connector portion has threads that are adapted to be engaged by a threaded nut for securing a terminal that is connected to a conductor to said second axially extending electrical connector portion.

9. The bridge rectifier according to claim 5 where said first and second diodes are arranged such that said first heat sink has a positive direct voltage polarity and said second heat sink has a negative direct voltage polarity.

10. In combination, an alternating current generator having an end frame, a rectifier unit secured to an exterior wall of said end frame, said rectifier unit having a metallic heat sink, a metallic terminal stud secured to said heat sink, said terminal stud having a first axially extending portion that has self-tapping threads and a second axially extending portion that has an electrical connector portion that is adapted to be connected to a conductor, said metallic heat sink having an opening, said first portion of said terminal stud being located in said opening and having a self-tapped threaded connection to said heat sink which is produced by said self-tapping threads when said first portion of said stud is screwed into said opening, said self-tapped threaded connection providing an electrical connection between said terminal stud and said heat sink and providing a mechanical connection between said terminal stud and said heat sink for supporting said terminal stud from said heat sink, said second portion of said terminal stud extending in a direction away from said exterior wall of said end frame.

11. The combination according to claim 10 where said rectifier unit is a polyphase full-wave bridge rectifier that is comprised of first and second electrically insulated metallic heat sinks each of which carries and is electrically connected to respective groups of diodes, said first heat sink carrying said terminal stud and said second heat sink engaging said exterior wall of said end frame.

12. The combination according to claim 10 that includes a cover that is secured to said end frame, said cover having an opening, said terminal stud projecting through said opening.

* * * * *